May 22, 1951
A. J. O. A. SALMONT
2,554,124
MEANS FOR AUTOMATIC CONTROL OF
MACHINERY OR OTHER DEVICES
Filed Oct. 28, 1946
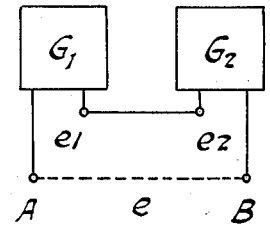
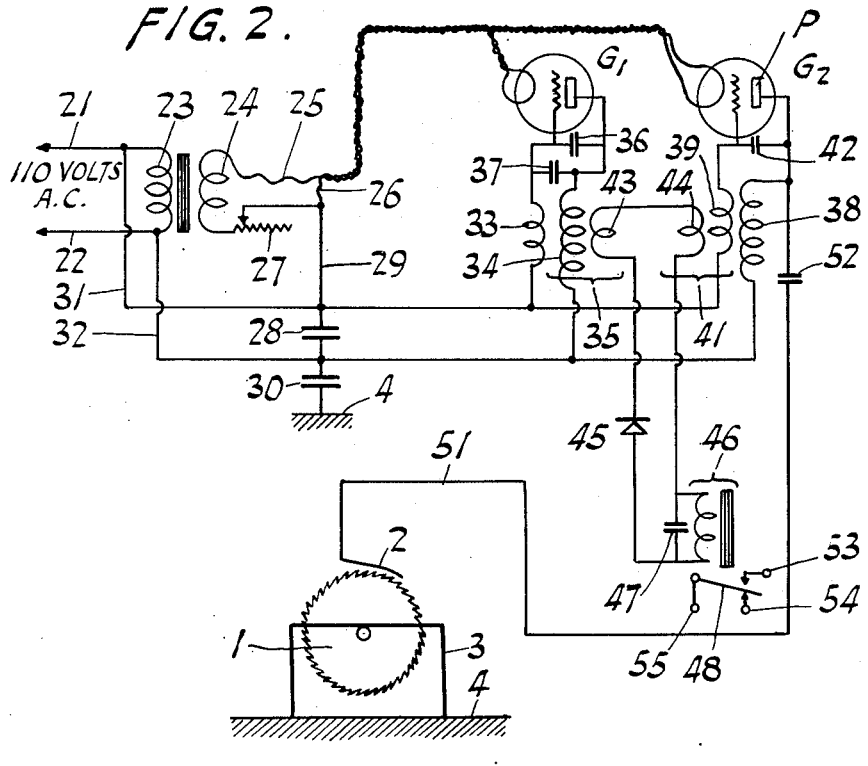
INVENTOR
ANDRE J. O. A. SALMONT,
BY Albert R. Henry
ATTORNEY.

Patented May 22, 1951

2,554,124

UNITED STATES PATENT OFFICE 2,554,124

MEANS FOR AUTOMATIC CONTROL OF MACHINERY OR OTHER DEVICES

André J. O. A. Salmont, East Syracuse, N. Y., assignor to Zita Wallace Salmont, East Syracuse, N. Y.

Application October 28, 1946, Serial No. 706,134
In France March 5, 1946

3 Claims. (Cl. 250—36)

1

This invention relates to the automatic control of machinery and other devices, and it has particular reference to a control system wherein the electrical capacity of the human or other body is utilized, upon the approach of the body to the machine or device, to modify the characteristics of a high frequency circuit connected to the machine or device, thereby to effect the stoppage of the machine or to give a warning signal.

The invention finds application in the control of moving machinery to prevent accidents to workmen approaching a danger zone in the mechanism. It may also be utilized to safeguard against the approach of animals, to warn of the presence of unauthorized persons near the thing to be protected, for the control of traffic, and for other purposes.

According to one mode of employing the principles of the invention, there is provided a high frequency electrical circuit having a branch or portion thereof extending to a plate forming one element of a condenser whose opposite side may be connected to the ground. Such plate may, for example, be a guard plate on a machine which protects a workman's hand or body from a dangerous instrumentality in the machine. The approach of the workman to within an unsafe distance with relation to the plate thereby effects a modification in the capacity of such condenser, and this effect in turn is made to modify, in operative manner, an electric circuit which governs the operation of the machine.

Inasmuch as all conductive bodies are possessed of some electrical capacity, it is apparent that they may modify the capacity of a high frequency circuit unintentionally under some conditions, as for example, touching the frame of the machine or other protected equipment at a place at which no danger exists. It is also to be remembered that practically all machines, and the driving motors therefor, are in contact with the ground, and thereby constitute or may constitute a conductive element of a condenser. In order to realize to best advantage the objects of the invention, it is therefore desirable to employ certain further principles in making practical applications.

Among these may be mentioned the provision of means whereby there may be established and maintained a condenser, consisting of the aforesaid guard plate or the like, and the body which exercises the control, whose capacity with reference to the ground shall be low but substantially constant. The guard plate or the like is, therefore, to be insulated with respect to the ground.

2

Further, for effecting the operation of a control circuit, within the limitations necessarily imposed by the problem, it is of advantage to cause the variation in the capacity of the controlling condenser to create a different frequency in an oscillating circuit, and thereby produce a series of beats between the frequencies of two tuned high frequency oscillating circuits. The effect of these beats is to cause a change in the electromotive force in a control sensing circuit, and such change may then be utilized to operate a relay, or other control instrumentality.

A further explanation of the principles of the invention may be undertaken with reference to the accompanying drawings, illustrating typical embodiments, and wherein:

Fig. 1 is a simple diagram presented to illustrate the fundamental principle of the invention; and Fig. 2 is a diagram of a high frequency electrical circuit whose characteristics are to be modified.

Referring first to Fig. 1, let it be understood that the devices marked $G_1$ and $G_2$ are interconnected generators of high frequency electrical oscillations, which respectively create electromotive forces $e_1$ and $e_2$ having ascertained frequencies and amplitudes. The resultant electromotive force $e$, as measured between the terminals A and B, is therefore also a high frequency electromotive force whose amplitude and frequency are measured by the sum or difference, as the case may be, of the characteristics of the separate electromotive forces $e_1$ and $e_2$. If, for example, the generators $G_1$ and $G_2$ produce voltages of the same frequency, then the resultant electromotive force will have that frequency, and the instantaneous voltage will depend upon the respective amplitudes and their difference in phase. Should the voltages be 180° out of phase, they will nullify each other, so as to produce no voltage between the terminals A and B. On the other hand, if some modification of the characteristics of one generator be effected, as, for example, changing its frequency, then that variation will reappear between the terminals A and B as an electromotive force having a frequency and amplitude equal to the sum or difference of the frequencies and amplitudes of the superimposed components $e_1$ and $e_2$. Under this last stated condition, a measurable electromotive force will be present between the terminals A and B, in accordance with the phenomenon known as the "law of beats."

The frequency of the generator $G_1$, for example, may be intentionally modified, thereby to create resulting "beats" and functionally useful electromotive forces, by incorporating in its circuit the condenser, previously described, composed of an insulated plate as one element, the ground as the other, and the body as a varying dielectric. While variation of such condenser capacity, and therefore of the frequency of the current emitted by generator $G_1$, is very small, its effect on oscillations of high frequency is sufficient to produce a relatively large variation of the frequency of the beats. Thus, for example, if $G_1$ and $G_2$ be so chosen as to produce, initially, electromotive forces of constant amplitude of ten volts at a frequency of one megacycle per second, then a modification of the frequency of the electromotive force $e_1$ of only one hundred cycles per second will produce between the terminals A and B an electromotive force whose instantaneous value varies between zero and ninety volts at a frequency of one hundred cycles per second. Such a resulting voltage is adequate to operate a relay interposed in a control circuit, and the capacity or dielectric effect of the human body is great enough to produce the stated change.

Referring next to Fig. 2, the numeral 1 designates a machine element, such as a circular saw, which must be approached by a workman, and which constantly presents an accident hazard. Some protection for the workman's fingers is provided by a guard plate 2, which, in this instance, is insulated from the machine frame in any suitable manner, and which is moreover made an element of the aforesaid condenser (the ground being the other element) whose variations in capacity produce the ultimate effect of controlling the movement of the mechanism. The saw itself is mounted in conventional manner on the machine frame 3, which in turn is supported on the ground 4, and accordingly there is presented a fixed condenser composed of the plate 2 on the one hand, and the elements 1 and 3 on the other. If the workman stands alongside of the machine frame, or touches it at a remote point with his hand, there is no sensible change in the capacity of the condenser, inasmuch as the mass of the machine frame is too great, in relation to the plate 2. However, if the workman should bring his fingers into too close proximity to the plate 2, then the capacity of the condenser 2—3 is materially modified, either by change of the dielectric constant between the condenser plate elements, or by grounding plate 2 to the machine frame 3 through the body. Obviously, this modification of capacity will not occur while a piece of wood is pushed past the saw, inasmuch as the wood itself is substantially nonconductive.

The normally fixed-capacity condenser 2—3 is connected into the circuit of a high frequency oscillator, in this instance the generator $G_2$ previously mentioned in connection with Fig. 1. Both generators or oscillators $G_1$ and $G_2$ are herein shown as multi-element vacuum tubes, whose filament circuits are connected in parallel and are supplied from any suitable source of power, such as the customary 110-volt, 60 cycle current. To aid in explanation, a triode has been shown, but a tetrode or pentode could just as well be used. The supply lines 21 and 22 are connected to the primary 23 of a step-down transformer, whose secondary 24 is connected to the filament lamp cords 25 and 26 through a variable resistance 27. The primary coil 23 is moreover bridged by a condenser 28, which may be of about 0.1 microfarad capacity, and one side of the condenser 28, together with supply line 21, is also connected to the circuit of the two generator filaments through wires 31, 29, 26. The condenser 28 serves as a by-pass condenser protecting the primary side of the transformer from radiofrequency energy. An additional condenser 30 is connected between the ground 4 and the line 32, to complete a grounding circuit so that no radiofrequency will be present in the primary voltage supply lines.

The wires 31 and 32, leading from the supply lines 21 and 22 to the condenser 28, are respectively extended to the grids and plates of the oscillators $G_1$ and $G_2$, but with a certain inversion in the order of connections, for a reason which will presently appear. The line 31 is tapped into an inductance coil 33 whose opposite end is directly connected to the grid element of oscillator $G_1$, while the line 32 is connected to the corresponding plate through the primary 34 of a close-coupled coil or transformer 35. A condenser 36, connected between grid and plate, and a second condenser 37, positioned between the coils 33 and 34, complete the circuit for an oscillating current flowing through the transformer coil 34, whose amplitude and frequency will depend, of course, upon the values assigned to the several capacities and inductances.

The lines 31 and 32 respectively lead to the grid and plate of the oscillator $G_2$, although in this instance, the connection from the line 32 to the plate P is through an inductance coil 38 (corresponding to the coil 33), and the connection to the grid is through the primary winding 39 of the transformer 41. A condenser 42 is also provided across the grid and plate of the generator $G_2$, thereby completing the second oscillating circuit.

Inasmuch as the winding 34 in the circuit of generator $G_1$ is inverted with respect to the winding 39 in the circuit of generator $G_2$, it will be apparent that the currents flowing through the two oscillating circuits are 180° out of phase, or are in opposition to each other. That is to say, at that instant when the alternating current supplied through the wires 31 and 32 produces current flowing downwardly in the winding 34, the current flowing through the winding 39 will be upward, or in the opposite direction, and this condition of mutual opposition will continue at all instants, and be independent of the wave form of the currents themselves.

Each winding 34 and 39 has associated therewith a close-coupled or secondary winding, 43 and 44 respectively, which are connected in series with each other and through a rectifier 45, relay 46 provided with an armature 48, and a filtering or by-pass condensed 47. The currents flowing through the windings 34 and 39 accordingly produce currents of similar frequency in the windings 43 and 44, and, if the elements of the circuits for the generators $G_1$ and $G_2$ are correctly chosen, then the electromotive forces $e_1$ and $e_2$, respectively across the secondaries 43 and 44, may be made of substantially the same value. Accordingly, and with the constant phase difference of 180° just explained, the resulting electromotive force across the rectifier 45 is zero, and the relay 46 remains deenergized.

The guard or detector plate 2, positioned adjacent the dangerous instrumentality 1, as previously described, is connected through a wire 51 and condenser 52 to the plate P of the generator $G_2$. When, as by the bringing of the hand into proximity to the plate 2, its condenser capacity is modified from its normal value, then the relations between capacities and inductances in the oscillatory circuit established for generator G₂ are also thrown out of balance, and the frequency of the oscillatory current is accordingly changed. In the illustration mentioned earlier, it was announced that with an initial frequency of one million cycles per second, a resulting change of frequency of say 100 cycles would produce such mixing, or number of beats, between the induced currents through the secondaries 43 and 44, as to pass a substantial current through the winding of the relay 46. The armature 48 accordingly is attracted to engage the contact 53, and simultaneously, if desired, to open a circuit taken through the lower contact 54 and the armature binding post 55.

The energizing of the relay 46 is utilized to control, in a manner too obvious to be illustrated, the circuits for the motor (not shown) for the machine tool 1, and for a brake for quickly bringing the tool to a stop. Thus, if the motor energizing circuit is taken through the connection points 55 and 54, while an electromagnetic braking circuit is taken through the points 54 and 53, the modification of the capacity of the condenser 2—3 effects, in the manner above explained, the simultaneous interruption of power to the motor and the application of a brake to the machine. Any type of circuit for this purpose may be adopted, according to the desire of the user.

It is believed that the functioning of the several aspects of the invention has been so fully elucidated that a restatement is not necessary. It will be seen that the invention provides a system of control, applicable to machines, guarded enclosures, or the like, wherein the capacity of an animate or inanimate body, with relation to the ground, may be made to modify the characteristics of a high frequency circuit, thereby to produce an effect or result which in turn may be employed to obtain the desired control. It should moreover be understood that, with respect to the broader aspects of the invention, it is not to be limited to the precise modes and instrumentalities herein set forth by way of illustration. Thus, one may employ one vacuum tube with several electrodes to generate the high frequency currents, and one may change in various ways the arrangement of the various parts. These and other variations and modifications, within the scope of the following claims, are intended to be encompassed by the invention.

I claim:

1. Control apparatus of the character described, comprising thermionic vacuum tube means including a cathode, grid and plate of a first oscillator and a cathode, grid and plate of a second oscillator, a condenser connected across the plate and grid of each of said oscillators and normally tuning said oscillators to substantially the same frequency, a source of alternating current, a line connecting one side of said source of alternating current jointly to the cathodes of both of said oscillators, a first inductor directly connecting said one side of said source of alternating current with the grid of said first oscillator, a second inductor directly connecting the other side of said source of alternating current with the plate of said second oscillator, a third inductor coupled with said first inductor and directly connecting said other side of said source of alternating current with the plate of said first oscillator, a fourth inductor coupled with said second inductor and directly connecting said one side of said source of alternating current with the grid of said second oscillator and arranged to normally maintain said oscillators approximately 180° out of phase, a capacitor connected to the circuit of one of said oscillators and arranged to have its capacity altered by the approach of a foreign object and to vary the resonant frequency of said one of said oscillators, and control means responsive to the joint output of said oscillators.

2. Control apparatus of the character described, comprising thermionic vacuum tube means including a cathode, grid and plate of a first oscillator, and a cathode, grid and plate of a second oscillator, a condenser connected across the plate and grid of each of said oscillators and normally tuning said oscillators to substantially the same frequency, a source of alternating current, a line connecting one side of said source of alternating current jointly to the cathodes of both of said oscillators, a first inductor directly connecting said one side of said source of alternating current with the grid of said first oscillator, a second inductor directly connecting the other side of said source of alternating current with the plate of said second oscillator, a third inductor coupled with said first inductor and directly connecting said other side of said source of alternating current with the plate of said first oscillator, a fourth inductor coupled with said second inductor and directly connecting said one side of said source of alternating current with the grid of said second oscillator and arranged to normally maintain said oscillators approximately 180° out of phase, a capacitor connected to the circuit of one of said oscillators and arranged to have its capacity altered by the approach of a foreign object and to vary the resonant frequency of said one of said oscillators, a secondary transformer coil means jointly coupled with said inductors, and control means in circuit with said secondary transformer coil means and operated by the energization of said secondary transformer coil means on out-of-phase oscillation of said oscillators.

3. Control apparatus of the character described, comprising thermionic vacuum tube means including a cathode, grid and plate of a first oscillator and a cathode, grid and plate of a second oscillator, a condenser connected across the plate and grid of each of said oscillators and normally tuning said oscillators to substantially the same frequency, a source of alternating current, a line connecting one side of said source of alternating current jointly to the cathodes of both of said oscillators, a first inductor directly connecting said one side of said source of alternating current with the grid of said first oscillator, a second inductor directly connecting the other side of said source of alternating current with the plate of said second oscillator, a third inductor coupled with said first inductor and directly connecting said other side of said source of alternating current with the plate of said first oscillator, a fourth inductor coupled with said second inductor and directly connecting said one side of said source of alternating current with the grid of said second oscillator and arranged to normally maintain said oscillators approximately 180° out of phase, a capacitor arranged to have its capacity altered by the approach of a foreign object, means including a condenser connecting said capacitor with the plate of one of said oscillators, a secondary transformer coil means jointly coupled with said inductors, and control means in circuit with said secondary transformer coil means and operated by the energization of said secondary transformer coil means on out-of-phase oscillation of said oscillators.

ANDRÉ J. O. A. SALMONT.

REFERENCES CITED

The following references are of record in the file of this patent:

UNITED STATES PATENTS

| Number | Name | Date |
|---|---|---|
| 1,878,109 | Clark | Sept. 20, 1932 |
| 2,146,073 | Jennens | Feb. 7, 1939 |
| 2,238,040 | Dickens | Apr. 15, 1941 |
| 2,288,364 | McArthur | June 30, 1942 |
| 2,343,987 | Lindsay | Mar. 14, 1944 |
| 2,395,780 | Devol | Feb. 26, 1946 |
| 2,422,742 | Odessey | June 24, 1947 |

FOREIGN PATENTS

| Number | Country | Date |
|---|---|---|
| 524,510 | Germany | May 8, 1931 |